Patented Oct. 10, 1933

1,930,271

UNITED STATES PATENT OFFICE 1,930,271

MANUFACTURE OF ALUMINATES

Harold W. Heiser, East St. Louis, Ill., assignor to Aluminum Company of America, Pittsburgh, Pa., a corporation of Pennsylvania No Drawing. Application March 28, 1932
Serial No. 601,721

11 Claims. (Cl. 23—52)

In the production of sodium aluminate, to which this invention relates, there are two general classes of processes in use, known respectively as the "wet" process and the "dry" process. In the older or dry process it has been customary to sinter together an aluminous material such as bauxite and an alkali such as soda ash. At its fusion temperature the soda ash reacts with the alumina of the bauxite to form sodium aluminate which is subsequently extracted from the gangue by water or a solution of dilute caustic soda. This type of process has been found to be inefficient, wasteful, and expensive. Therefore, the so-called wet process has, more recently, found extensive commercial application. In the wet process a sodium aluminate solution is obtained directly by digestion of the aluminous ore with a solution of caustic soda, and is then separated from the insoluble material. These processes were devised primarily for use in the extraction of alumina from its ores and are eminently satisfactory for this purpose, as they produce solutions of substantially pure sodium aluminate from which the alumina may be precipitated readily by means of carbon dioxide for example.

Sodium aluminate, as a separate industrial product, has recently found a wide commercial application, particularly as a reagent in the industrial purification of water. For this purpose it is desirable that the sodium aluminate be of a high purity and substantially free from insoluble matter. The cost and difficulty encountered in the handling and shipping of sodium aluminate solutions makes them commercially undesirable as a source of pure sodium aluminate. To obtain a solid aluminate from solutions of sodium aluminate is costly and not, therefore, entirely desirable. Likewise the product obtained may be contaminated by an excess of caustic soda which is always present in such solutions to prevent the hydrolysis of the sodium aluminate and the consequent precipitation of aluminum hydrate. It is an object of this invention to provide a method for the production of solid sodium aluminate of high purity and substantially free from insoluble material. It is a further object of this invention to produce solid sodium aluminate having a composition conforming substantially to the formula $Na_2O.Al_2O_3$.

In experimenting with the dry process or furnacing method of producing sodium aluminate, I have found that the use of substantially pure raw materials in the processes heretofore known will yield a product which is substantially free from foreign impurities, but will not yield a product which is substantially free from insoluble material, nor one which necessarily conforms to the formula $Na_2O.Al_2O_3$. The reaction between the alumina and the soda ash is partially incomplete and a considerable proportion of uncombined insoluble material is left in the reaction product. Likewise certain technical difficulties encountered in the carrying out of these known furnacing methods render the maintenance of an accurate reaction mixture difficult or impossible, which further contributes to the production of an undesirable product.

Sodium aluminate which conforms to the formula $Na_2O.Al_2O_3$ has a theoretical ratio of 1.275 parts of alumina to 1 of soda, calculated as NaOH. This product is quite soluble in water but hydrolyzes readily to form a flocculent precipitate of aluminum hydrate. It is this property of the material which is particularly valuable in the treatment of water. It is desirable, therefore, that a solid sodium aluminate for this purpose should conform as closely as possible to the theoretical composition. However, unless the reaction between soda ash and alumina proceeds substantially to completion, it is impossible to obtain, in solid form, a product of theoretical composition which is substantially free from impurities and insoluble material.

I have discovered that a substantially complete reaction may be effected between alumina and soda ash if the finely divided raw materials are briquetted before furnacing. I have also discovered that by the use of suitable inorganic bonding agents which do not increase the impurity content of the reaction product, it is possible to produce from briquettes of substantially pure alumina and soda ash a solid sodium aluminate which contains only a relatively small proportion of insoluble material, which is, or is almost, free from impurities and which conforms substantially to the theoretical composition $Na_2O.Al_2O_3$. In practicing my invention, the raw materials, first ground to a fineness of about 80 to 100 mesh, are intimately mixed and the bonding agent then incorporated in the mixture with moisture sufficient to produce a mix of suitable consistency for molding. Briquettes are then formed of this material and are dried and heated to temperatures of about 900° to 1100° centigrade.

By my process of briquetting, I establish, between the particles of the respective components of the reaction mixture, a closer, more intimate and regular contact than has heretofore been obtained and, when the reaction temperature is reached, the reaction proceeds throughout the briquetted mass without difficulty. This is evidenced by the fact that a surface combustion effect is observable in the briquettes, which proceeds throughout the reaction. Such an effect is not observable in an unbriquetted mass of the raw materials heated to the same temperature. By briquetting I also overcome to a large extent the technical difficulties which have heretofore impaired the efficiency of furnacing methods for the production of sodium aluminate. Dust losses, for example, are substantially eliminated, thus effecting a conservation in raw materials and permitting the maintenance of a balanced reaction mixture. Volatilization losses, which are also common to the furnacing processes and by which considerable amounts of soda ash are lost, are substantially reduced by my method.

While I may practice my invention in connection with the production of sodium aluminate of substantially any degree of purity and thereby effect an improvement in process efficiency, my invention is primarily directed to the production of a specific product; that is, a solid sodium aluminate conforming substantially to theoretical composition and substantially free from impurities and insoluble material. Thus I prefer to use in my process, and I necessarily use in the production of this product, purified alumina and soda ash of a chemically pure grade. By the term "alumina" as used herein and in the appended claims, I mean not only aluminum oxide, but also the several hydrated oxides of aluminum; and by "purified alumina" is meant such a material as is prepared by the well-known Bayer process, which material generally contains less than about 0.1 per cent of impurities other than soda. By soda ash of chemically pure grade, I mean a product containing about 99.0 per cent of sodium carbonate.

The soda ash and alumina may be used in the theoretical combining proportions. However, I have found that in practice it may be preferable to use an excess of soda ash. While briquetting reduces the volatilization of soda ash during the furnacing process, the volatilization is not completely eliminated, and the presence of excess soda ash compensates for this loss. Also, the excess soda ash increases the efficiency of the process as it tends to drive the reaction towards completion. As hereinafter explained, soda ash has certain bonding qualities, which may be utilized in the formation of briquettes for use under certain conditions. In practice I have found that a satisfactory product may be obtained by furnacing mixtures of alumina and soda ash containing between 10 parts by weight of alumina to 10.5 parts by weight of soda ash and 10 parts alumina to 13.0 parts soda ash.

In forming the briquettes, the inorganic bonding agent may be mixed with the reaction mixture in any manner so long as sufficient moisture is incorporated in the mix to give the mix a moldable consistency. As bonding agents I have found that certain inorganic salts are most satisfactory as they lend to the mass the desired adherence without contamination of the reaction product. Soda ash possesses some binding power and I have been able to form briquettes using an excess amount of that material merely by the addition of a suitable amount of water to the mixture. The briquettes formed in this manner, while satisfactory for use in a process carried out in a reverberatory furnace, or other type of furnace in which the briquettes are subjected to only a relatively small amount of stirring or tumbling, are not generally satisfactory, particularly for use in a rotary kiln, as the soda ash apparently loses its binding properties upon heating, and substantial crumbling of the briquettes takes place if they are subjected to considerable abrasion. I prefer, therefore, to use as a bonding agent sodium aluminate, which has, I have found, excellent binding properties which it retains throughout the temperature range at which the process is practiced, and by its use I have been able to produce hard, firm briquettes which retain their form without substantial crumbling or disintegration, even when treated in a rotary kiln.

When using soda ash as the binding material, I preferably moisten a mixture of alumina and soda ash, containing soda ash in excess, with about 10 to 15 per cent of water, thoroughly mix the mass and immediately briquette it before the soda ash unites with the water to form the hard, crystalline hydrate of sodium carbonate, which has no binding power. The briquettes thus formed are dried for several hours to obtain relatively hard, firm briquettes. The strength of the briquettes increases as the amount of soda ash over that theoretically required by the reaction is increased. I have found that in order that the briquettes retain their form without substantial crumbling, even when used in a reverberatory type furnace, the amount of excess soda ash in the mixture should be such that at least 12 per cent, and preferably up to about 30 per cent, excess be contained in the briquette after the furnacing operation is complete.

When sodium aluminate is used as the bonding agent in the formation of the briquettes it may be added to the mixture of alumina and soda ash either as a solution or as the solid material with a subsequent addition of sufficient water to give to the mass the desired molding qualities. Generally the latter method is preferable. I prefer to use the sodium aluminate in amounts of about 15 to 20 per cent of the dry weight of the reaction mixture, although satisfactory results may be obtained with somewhat less than this amount. The amount of moisture required is usually about 10 to 15 per cent of the total weight of the reaction mixture. Briquettes made from such mixtures are very hard and firm and retain their properties at the temperature of the reaction. They are particularly suited to furnacing in a rotary kiln.

The furnacing of the briquetted soda ash-alumina mixture may be practiced in any suitable type furnace in which temperatures of 900° to 1100° centigrade can be obtained. Surface combustion hearth furnaces and rotary kilns have proved satisfactory for this purpose, but I prefer to use a rotary kiln as by its use a continuous operation may be effected. The temperature of the furnacing operation should not be permitted to exceed 1100° centigrade, as substantial losses of soda ash by volatilization occur at higher temperatures and decomposition of the sodium aluminate may take place at temperatures above 1150 or 1200° centigrade. A temperature of about 1000° centigrade is preferred. The period of heating will vary with the temperature used and the exact conditions under which the reaction is carried out. The heating should, however, be continued until the reaction is complete, which is usually a period of several hours.

The following experiment is cited as a specific example of the results obtained in practicing my process, in the preferred manner, to produce sodium aluminate of high purity substantially free from insoluble material. 100 parts by weight of finely ground purified aluminum hydrate, 30 parts of soda ash, containing about 99.0 per cent sodium carbonate, and 35 parts of sodium aluminate were thoroughly mixed in a suitable apparatus. Water was added during the mixing until the mass had attained a moldable consistency. About 10 per cent of water was required. Briquettes were formed of the mix and dried for several hours. The briquettes were then heated in a rotary kiln to about 1100° centigrade. The resulting product contained 1.284 parts of $Al_2O_3$ to every part of $Na_2O$, calculated as NaOH, and contained only 0.42 per cent insoluble material. The product lost only about 0.18 per cent of its weight when ignited.

Having thus described my invention, I claim:

1. A method of producing solid sodium aluminate from a reaction mixture substantially free from carbonaceous material, which comprises intimately mixing finely ground alumina with finely ground soda ash, incorporating in said mixture an inorganic bonding agent and moistening said mixture to a moldable consistency, forming briquettes of the mixture and heating said briquettes to a temperature of between 900° and 1100° centigrade.

2. A method of producing a solid sodium aluminate substantially free from impurities and having a composition conforming substantially to the formula $Na_2O.Al_2O_3$, from a reaction mixture substantially free from carbonaceous material which comprises intimately mixing finely ground alumina with finely ground soda ash, incorporating in said mixture an inorganic bonding agent and moistening said mixture to a moldable consistency, forming briquettes of the mixture and heating said briquettes to a temperature of between 900° and 1100° centigrade.

3. A method of producing solid sodium aluminate substantially free from impurities and having a composition conforming substantially to the formula $Na_2O.Al_2O_3$, from a reaction mixture substantially free from carbonaceous material, which comprises intimately mixing finely ground alumina with an excess of finely ground soda ash, moistening said mixture to a moldable consistency, forming briquettes of the mixture and heating said briquettes to a temperature of between 900° and 1100° centigrade.

4. A method of producing solid sodium aluminate substantially free from impurities and having a composition conforming substantially to the formula $Na_2O.Al_2O_3$, which comprises intimately mixing finely ground alumina with finely ground soda ash, incorporating in said mix sodium aluminate as a bonding agent and water enough to give the mass a moldable consistency, forming briquettes of the mixture and heating said briquettes to a temperature of between 900° and 1100° centigrade.

5. A method for producing solid sodium aluminate of high purity and substantially free from insoluble material, from a reaction mixture substantially free from carbonaceous material, which comprises intimately mixing finely ground purified alumina and soda ash of chemically pure grade, briquetting said mixture with an inorganic bonding agent and heating the briquettes at a temperature of between 900° and 1100° centigrade.

6. A method of producing solid sodium aluminate of high purity and substantially free from insoluble material, from a reaction mixture substantially free from carbonaceous material, which comprises intimately mixing finely ground purified alumina and an excess of finely ground soda ash of chemically pure grade, moistening said mixture to a moldable consistency and briquetting the mixture and heating said briquettes to a temperature of between 900° and 1100° centigrade.

7. A method of producing solid sodium aluminate of high purity and substantially free from insoluble material, which comprises intimately mixing finely ground purified alumina and soda ash of chemically pure grade, incorporating in said mixture sodium aluminate bonding agent and moistening the mixture to a moldable consistency, forming briquettes of the mixture and heating said briquettes to a temperature of between 900° and 1100° centigrade.

8. A briquette consisting of alumina and soda ash bonded together by sodium aluminate.

9. A method of producing solid sodium aluminate of high purity and substantially free from insoluble material, which comprises intimately mixing finely ground purified alumina and a soda ash of chemically pure grade, moistening said mixture with a solution of sodium aluminate, forming briquettes of the mixture thus treated and heating the material to a temperature of between 900° and 1100° centigrade.

10. A method of producing solid sodium aluminate of high purity and substantially free from insoluble material, which comprises intimately mixing finely ground purified alumina and finely ground soda ash of chemically pure grade, incorporating in said mixture 15 to 20 per cent of solid sodium aluminate, moistening the mixture to moldable consistency with water, forming briquettes of the mixture thus treated and heating said briquettes to a temperature of between 900° and 1100° centigrade.

11. A method of producing solid sodium aluminate of high purity and substantially free from insoluble material, which comprises intimately mixing 10 parts of finely ground purified aluminum hydrate and 8 parts of finely ground soda ash of chemically pure grade, adding thereto 35 parts of solid sodium aluminate, moistening said mixture with about 10 to 15 per cent of water, forming briquettes of the mixture thus treated and heating said briquettes to a temperature of between 900° and 1100° centigrade.

HAROLD W. HEISER.

CERTIFICATE OF CORRECTION.

Patent No. 1,930,271.　　　　　　　　　　　　　　　　　October 10, 1933.

HAROLD W. HEISER.

It is hereby certified that error appears in the printed specification of the above numbered patent requiring correction as follows: Page 3, line 101, claim 7, after "aluminate" insert as a; and that the said Letters Patent should be read with this correction therein that the same may conform to the record of the case in the Patent Office.

Signed and sealed this 21st day of November, A. D. 1933.

F. M. Hopkins (Seal)　　　　　　　　　　　　　　　　　　　　　　　Acting Commissioner of Patents.